June 8, 1954 K. E. MOYER 2,680,306
EDUCATIONAL TOY
Filed April 8, 1952 2 Sheets-Sheet 1
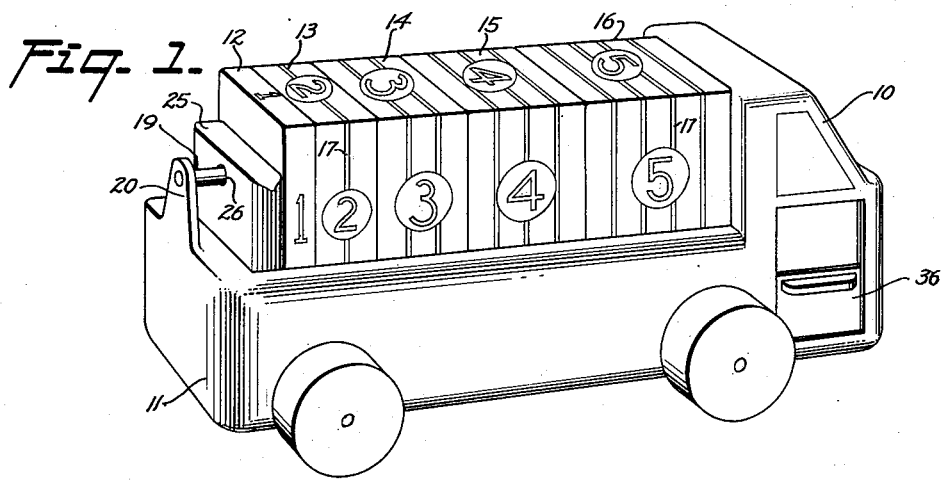
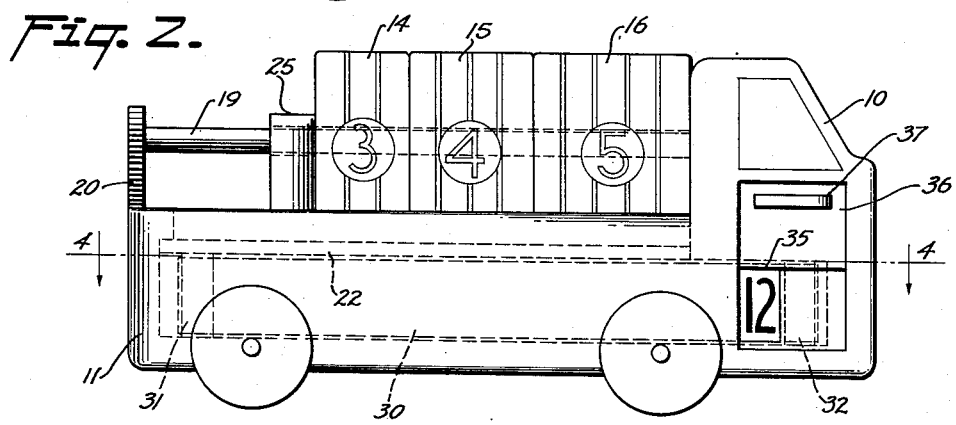
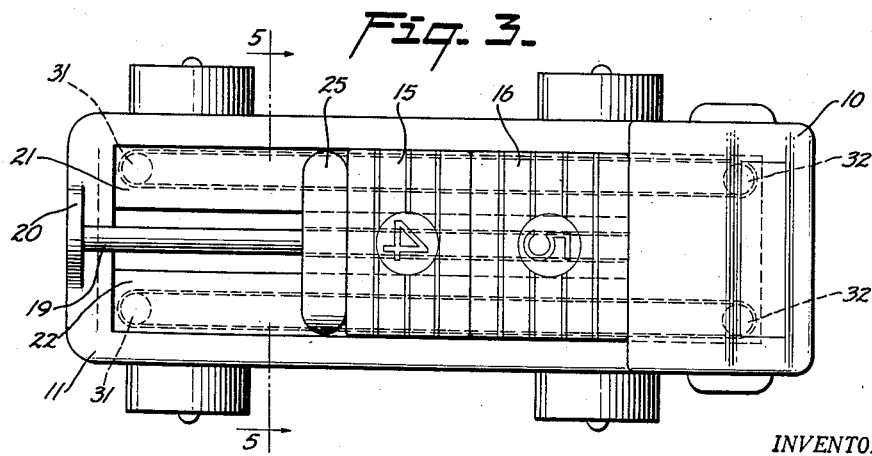
INVENTOR.
KENNETH E. MOYER
BY
ATTORNEY.

June 8, 1954  K. E. MOYER  2,680,306
EDUCATIONAL TOY
Filed April 8, 1952                                    2 Sheets-Sheet 2
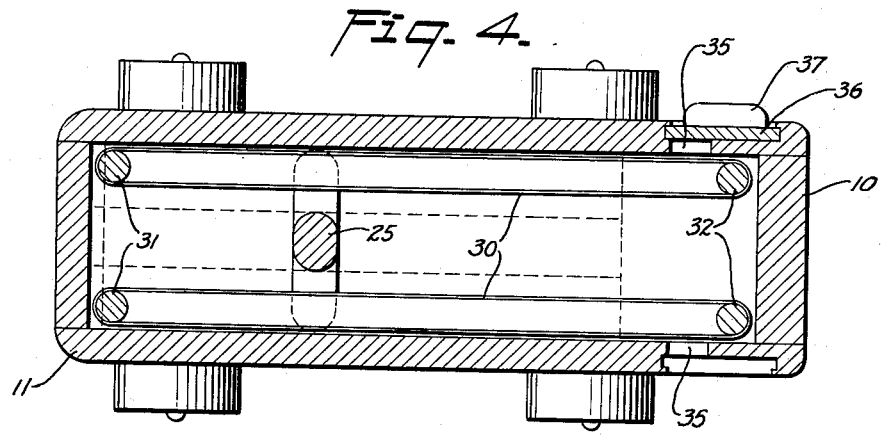
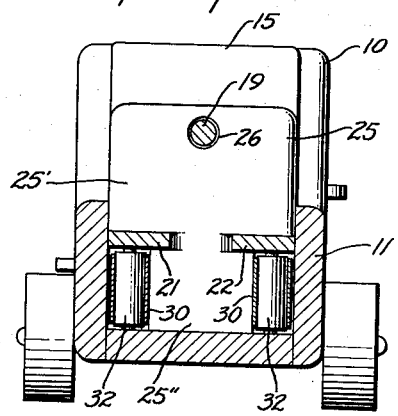
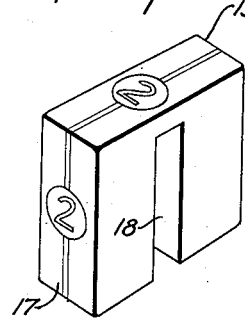
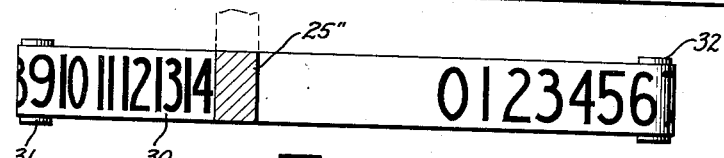
INVENTOR.
KENNETH E. MOYER
BY
ATTORNEY.

Patented June 8, 1954

2,680,306

UNITED STATES PATENT OFFICE 2,680,306

EDUCATIONAL TOY

Kenneth E. Moyer, Port View, Pa., assignor to Bernard N. Cantor and Educational Toy Institute of New York, Staten Island, N. Y.

Application April 8, 1952, Serial No. 281,175

14 Claims. (Cl. 35—31)

This invention relates to educational toys, more particularly to educational toys for teaching a young child certain elementary principles of arithmetic such as adding and subtracting.

One object of the present invention is to provide a novel and improved toy of the general type, above referred to, which permits a child by compiling blocks each representing a certain figure to form corresponding different sums and by then manipulating a computing or totalling member to produce an indication of the sum total represented by the compiled blocks. A toy of this type will tend to induce a child to find for himself the sum total represented by the blocks and then to check his own findings against the indicated sum total.

Another object of the invention is to provide a toy of the general type, above referred to, so designed that the acts of compiling a varying number of blocks and of manipulating the computing member are within the grasp of a young child of about school age, and of a kind with which a child in this age group is already familiar by his usual play activities.

Another more specific object of the invention is to provide a novel and improved educational toy so designed that the addition or subtraction of various sums by compiling or removing blocks are performed by fitting blocks in a receiving receptacle or frame, for instance by loading blocks on a toy vehicle such as a truck, and that the manipulation of the computing member is performed by simply pushing the said member against the stack of compiled blocks. Fitting parts in a form or loading a toy and pushing a sliding part are among the activities most frequently practiced by a playing child so that a child will easily grasp the operation of the toy according to the invention and will gradually and in a playful manner learn the sums total represented by the blocks.

Another object of the invention is to provide indicating means which are automatically set by manipulation of the computing member and which can be either covered or uncovered by the child. As a result, a child is induced to find the respective total before uncovering the indicating means.

Other points, features and advantages of the invention will be pointed out hereinafter and set forth in the appended claims forming part of the application.

In the accompanying drawing, a now preferred embodiment of the invention is shown by way of illustration and not by way of limitation.

In the drawing:

Fig. 1 is a perspective view of an educational toy according to the invention.

Fig. 2 is an elevational side view of the toy.

Fig. 3 is a plan view of Fig. 2.

Fig. 4 is a section taken on line 4—4 of Fig. 2.

Fig. 5 is a section taken on line 5—5 of Fig. 3.

Fig. 6 is a perspective view of one of the blocks and

Figs. 7 and 8 show details of the indicating means associated with the toy.

An educational toy according to the invention comprises basically a plurality of blocks each representing a certain figure value; a receiving or support structure upon which any selected number of said blocks can be placed; a movable computing member which can be moved into engagement with the stack formed by the selected blocks; and an indicator controlled by the computing member and showing the sum total represented by all the selected blocks. It will be apparent that each of the aforementioned components can take various shapes within the scope of the invention. At the present time the illustrated exemplification of the invention is the preferred one since it combines simplicity of manufacture with attractiveness to a child and is of a general type with which a child is well familiar.

Referring now to the figures in detail, the receiving or supporting structure of the toy is shown in form of a toy vehicle, more specifically in form of a truck. The illustrated truck is designed with a driver's cab 10 and an open body 11. The truck can be made of any suitable material, generally wood is preferable, both for reasons of price and of safety. The vehicle body serves to receive number blocks each representing a selected figure. There are shown by way of example five blocks 12, 13, 14, 15 and 16 to which are assigned the numbers 1 to 5 respectively. As will be noted, the blocks are of generally square or rectangular configuration and of different thickness or height. Block 12 representing the lowest figure is the thinnest block and the thickness of this block is taken as representing the unit 1. Accordingly, block 13 has twice the thickness of block 12 and so forth. As will be noted, thickness lines 17 mark the number of units represented by each block thereby associating a higher figure value with a larger size of the block representing the figure value.

While it is generally preferred to use blocks of the configuration here shown and of different size, it is also within the scope of the invention to provide a plurality of blocks all of the same size or all representing the same figure value. Furthermore, instead of rectangular blocks, blocks of another geometric configuration can be employed such as triangular blocks or spheres of different or equal diameter. Accordingly, the term "block," as herein used, is intended to refer to any member representing a figure value.

The blocks are designed for insertion upon or rather in vehicle body 11 and have, for this purpose, preferably a width corresponding approximately to the inner width of the vehicle body. As can be best seen on Fig. 6, each block is provided with a slot 18 with which the blocks can be fitted upon a guide bar 19. This guide bar is fastened at one end to the rear wall of cab 10 and on the other end to a bracket 20 protruding from the rear wall of vehicle body 11. The, blocks rest in the vehicle body upon two brackets 21 and 22 secured to the long side walls of the vehicle body, as can best be seen on Fig. 5. The support brackets may be designed so as to simulate benches and also serve to provide space for the indicating means, as will be more fully explained hereinafter.

The indicating means are actuated by a computing member 25 which is shown as a plate having an upper portion 25' located above benches 21 and 22 and a lower portion 25" located in the space defined by the benches and the bottom of the vehicle body. The upper portion 25' is provided with a hole 26 therethrough by means of which the computing plate 25 is slidably guided on bar 19.

The indicating means are shown as comprising a tape 30 which is guided and stretched by two rollers or dowels 31 and 32, one preferably mounted near the rear end of the vehicle body and the other in the cab of the vehicle, as can best be seen on Fig. 4. The tape may be guided on bushings revolving about rollers 31 and 32.

As can best be seen on Figs. 7 and 8, the tape bears on its outside in longitudinal spacing different numbers representing all the sums total which can be formed by any combination of the blocks 12 to 16. It will be apparent that the possible combinations involve any of the numbers 1 to 15 inclusive. In addition, the number 0 is also provided in case none of the blocks is used. Basically one set of numbers on the tape is sufficient, but it may be preferable to provide two sets as will be more fully explained hereinafter.

While a single tape permits to obtain the desired indications, it is generally advisable to provide a tape along each side of the vehicle. Accordingly, two tape mechanisms are shown.

The lower portion 25" of the computing plate is secured to one length of each tape by any suitable means such as gluing or stapling, so that displacement of the computing member along bar 19 will result in a corresponding displacement of the tapes. Each tape coacts with a window opening 35 which may be provided in any suitable part of the vehicle, preferably in the cab as is shown. A slidable cover 36 is preferably provided to cover and uncover the window opening at will. The window cover can be slid by means of a handle 37 in appropriate guide tracks provided in cab 10.

The positions of the numbers on the tapes and the position of computing member 25 are so correlated that when the computing member is placed in engagement with the adjacent block or in engagement with the rear wall of cab 10, the corresponding summation will appear in windows 35.

The operation of the toy as hereinbefore described is as follows:

Let it be assumed that, as shown on Fig. 2, a child places blocks 14, 15 and 16 on the truck. These blocks represent twelve units. In other words, a stack is compiled which represents a summation of 3+4+5. When, now the computing plate is pushed against block 14, as is shown on Fig. 2, number 12 on each tape will be placed in registry with the windows 35. A child may then open one of the covers 36 and verify the result which it may have obtained by his own addition. Similarly, a removal of block 14 followed by the corresponding displacement of the computing plate will constitute a subtraction of 3 from 12 and the number 9 will appear in registry with the windows. If all the blocks are removed and plate 25 is pushed flush against the rear wall of cab 10 the number 0 will appear in the windows.

The aforementioned second set of numbers on each tape is so arranged that the correct summation number will be visible at the rear end of the vehicle body and can be observed through the gap between benches 21 and 22.

While the invention has been described in detail with respect to a certain now preferred example and embodiment of the invention it will be understood by those skilled in the art after understanding the invention, that various changes and modifications may be made without departing from the spirit and scope of the invention.

What is claimed as new and desired to be secured by Letters Patent is:

1. An educational toy for teaching elementary principles of arithmetic, the said toy comprising in combination a plurality of blocks each representing a selected number, the said blocks having different dimensions of thickness, the thickness of the block representing the lowest number constituting one unit and the blocks representing the higher numbers having a multiple thickness in accordance with the corresponding number of units of thickness, a receiving structure adapted to stack thereon any selected multitude of said blocks, the length of a stack of blocks being indicative of the sum total represented by the stacked blocks, a computing member slidably mounted on the receiving structure and movable into engagement with one end of any stack of blocks stacked on the receiving structure, a portion of said receiving structure forming an abutment for the other end of said stack of blocks for retaining the said stack end in the same predetermined position, and a movable indicating member connected to the computing member for movement in unison therewith, the said indicating member bearing thereon spaced figures representing the sums total of all possible combinations of blocks, the movements of said computing member and the spacing of the figures on said indicating member being correlated with the different dimensions of the blocks in a spatial relationship such that in each stack engaging position of the computing member the figure on the indicating member constituting the sum total of the numbers as represented by the length of the stack of blocks is placed in the same predetermined position.

2. An educational toy for teaching elementary principles of arithmetic, the said toy comprising in combination a plurality of blocks each representing a selected number, the said blocks having different dimensions of thickness, the thickness of the block representing the lowest number constituting one unit and the blocks representing higher numbers having a multiple thickness in accordance with the corresponding number of units of thickness a receiving structure adapted to stack thereon any selected multitude of said blocks, the length of a stack of blocks being indicative of the sum total represented by the stacked blocks, a computing member slidably mounted on the receiving structure and movable into engagement with one end of any stack of blocks stacked on the receiving structure, a portion of said receiving structure forming an abutment for the other end of said stack thereby retaining the said stack end in the same predetermined position, an indicating tape bearing thereon in longitudinal spacing figures representing the sums total of all possible combinations of blocks, the said computing member being operatively coupled with said tape for displacing the latter relative to the receiving structure upon displacement of the computing member, the spacings of said tape figures and the positions of the computing member being correlated to the different dimensions of the blocks so that in each stack engaging position of the computing member the figure on the tape constituting the sum total corresponding to the length of a stack of blocks appears in the same predetermined position relative to the receiving structure.

3. An educational toy for teaching elementary principles of arithmetic, the said toy comprising in combination a plurality of blocks each representing a selected number, the thickness of a block determining the number value thereof a receiving structure adapted to stack thereon any selected multitude of said blocks, a portion of said structure forming a fixed abutment for one end of a stack of blocks, the length of a stack of blocks being indicative of the sum total represented by the stacked blocks, a computing member slidably mounted on the receiving structure and movable into engagement with the other end of any stack of blocks stacked on the receiving structure, an indicating tape bearing thereon in longitudinal spacing figures representing the sums total of all possible combinations of blocks, and guide means on the receiving structure holding the tape stretched and guiding the same for longitudinal displacement relative to the receiving structure, the said computing member being secured to the tape for moving the latter in unison with the computing member, the spacings of said tape figures and the positions of the computing member being correlated to the dimensions of individual blocks so that in each stack engaging position of the computing member the figure on the tape constituting the sum total corresponding to the length of a stack of blocks appears in the same predetermined position relative to the receiving structure.

4. An educational toy as defined in claim 3, wherein said indicating tape is in form of an endless tape, and wherein said guide means comprise two rollers guiding said endless tape, the said rollers being spaced so as to hold the tape in stretched position.

5. An educational toy as defined in claim 3, wherein said receiving structure is in form of an open receptacle formed with a window in one of its side walls, and wherein said indicating tape is disposed within said receptacle substantially concealed by the side walls thereof, the tape figure being in said predetermined position appearing in registry with said window.

6. An educational toy as defined in claim 5, wherein the said receptacle is substantially rectangularly shaped, one of the short side walls of the receptacle forming said abutment for one end of a stack of blocks placed in the receptacle, the said computing member being longitudinally displacable in the receptacle.

7. An educational toy as defined in claim 3, wherein the said blocks are of different dimensions of thickness, the thickness of the block representing the lowest figure constituting one unit and the blocks representing higher figures having a thickness in accordance with the corresponding number of units of thickness.

8. An educational toy for teaching elementary principles of arithmetic, the said toy comprising in combination a toy vehicle formed with an open body and a driver's cab, a plurality of blocks adapted to be placed in said vehicle body and to form a stack therein abutting with one end against said cab, each of said blocks representing a number, said blocks having different dimensions of thickness, the thickness of the block representing the lowest number constituting one unit and the blockings representing higher numbers having a multiple thickness in accordance with the corresponding number of units of thickness, a computing member mounted on the vehicle body slidable between the cab end of the vehicle and the opposite end thereof and adapted to engage the other end of a stack of blocks placed in the vehicle body, and a movable indicating tape disposed on the vehicle and calibrated with figures representing the sum total of all possible block combinations, the said tape being secured to said computing member for movement in unison therewith, the spacings of said tape figures and the positions of the computing member being correlated with the different dimensions of the blocks so that in each stack engaging position of the computing member the figure on the tape constituting the sum total according to the length of a stack of blocks appears in the same predetermined position relative to the receiving structure.

9. An educational toy as defined in claim 8, wherein said vehicle body includes support means positioned to support blocks above the bottom of the vehicle body, and wherein said indicating tape is disposed between the support means and the bottom of the vehicle body.

10. An educational toy as defined in claim 9, wherein the cab portion of the vehicle is formed with a lateral window so positioned that the respective tape figure being in the said predetermined position is in registry with said window.

11. An educational toy as defined in claim 10, wherein a window cover is slidably mounted on said cab portion of the vehicle for selectively covering and uncovering the said window.

12. An educational toy as defined in claim 8, wherein the said indicating tape is in form of endless tape, and wherein a pair of guide rollers are disposed in the cab portion and near the rear end of the vehicle body for guiding the tape parallel to a side wall of the vehicle and along the said window.

13. An educational toy as defined in claim 8, in combination with a guide bar extending from the cab portion to the rear end of the vehicle body, the said computing member being slidably guided on said bar.

14. An educational toy as defined in claim 13, wherein each of said blocks is formed with a slot engageable with said guide bar for guiding the blocks along the said bar.

References Cited in the file of this patent

UNITED STATES PATENTS

| Number | Name | Date |
|---|---|---|
| 1,594,376 | Passmore | Aug. 3, 1926 |
| 1,950,072 | Townsend | Mar. 6, 1934 |
| 2,402,892 | Hubble | June 25, 1946 |
| 2,494,469 | Booth | Jan. 10, 1950 |
| 2,494,497 | Trapnell | Jan. 10, 1950 |